(No Model.)
J. L. PERRY.
DEVICE FOR ADJUSTING SANDPAPER CYLINDERS.
No. 531,273. Patented Dec. 18, 1894.
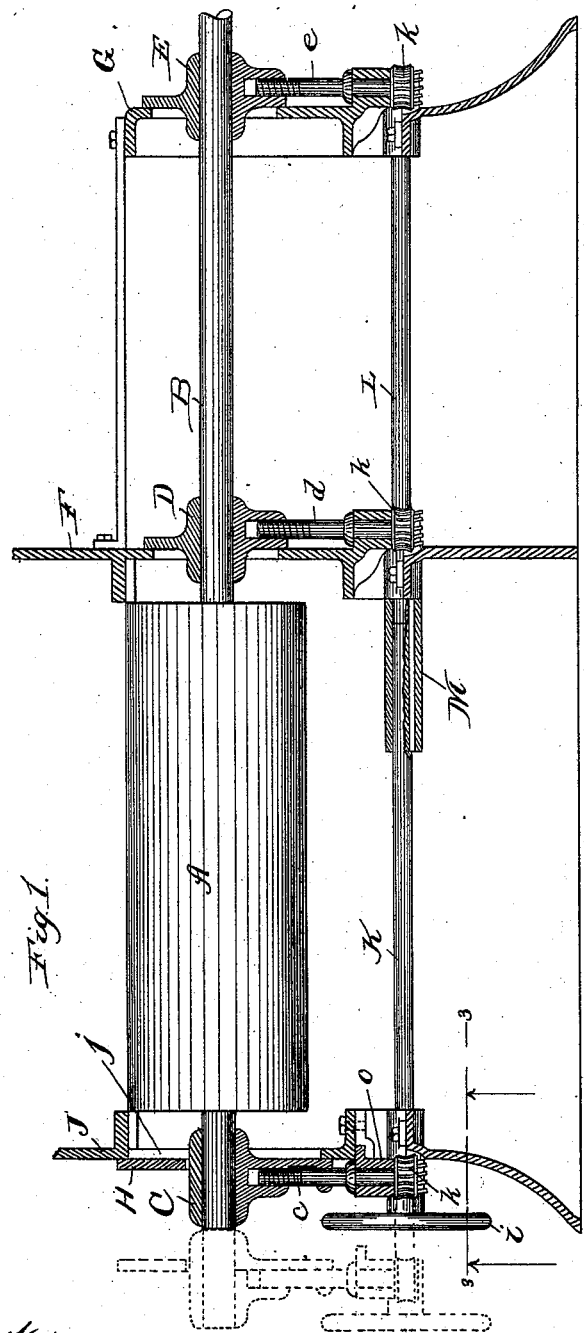
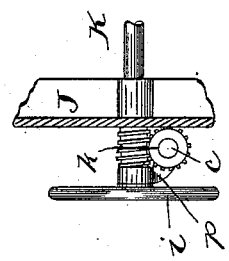
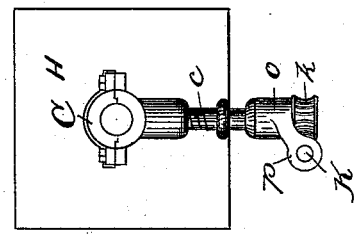
Inventor:
James L. Perry
By Munday, Evarts & Adcock,
His Attorneys
Witnesses:
Sew. C. Curtis
A. W. Munday,

UNITED STATES PATENT OFFICE.

JAMES L. PERRY, OF CHICAGO, ILLINOIS, ASSIGNOR TO THE PERRY SANDER COMPANY, OF SAME PLACE.

DEVICE FOR ADJUSTING SANDPAPER-CYLINDERS.

SPECIFICATION forming part of Letters Patent No. 531,273, dated December 18, 1894.

Application filed February 12, 1892. Renewed April 16, 1894. Serial No. 507,775. (No model.)

*To all whom it may concern:*

Be it known that I, JAMES L. PERRY, a citizen of the United States, residing in Chicago, in the county of Cook and State of Illinois, have invented a new and useful Improvement in Devices for Adjusting Sandpaper-Cylinders, of which the following is a specification.

In order to facilitate the putting on the sand paper coverings of the cylinders of wood polishing machines, I have heretofore made the bearings at one end of the cylinders removable, and have also provided openings in the side frames of the machine sufficiently large to give access to the cylinders for the purpose of replacing the sand paper. It is very desirable of course that this removable bearing when replaced shall come back into exact alignment with the other bearing or bearings of the same cylinder, because otherwise it must be carefully readjusted with each removal.

To prevent this loss of adjustment is the main object of my present invention, and I accomplish it by the construction hereinafter set forth, and which will be understood from the drawings accompanying this specification, wherein—

Figure 1 is a partial transverse vertical section of a machine embodying my improvement. Fig. 2 is a partial side elevation showing the removable bearing, the hand wheel for operating the adjusting shaft being omitted. Fig. 3 is a section on the line 3—3 of Fig. 1.

In said drawings A represents the cylinder of a wood polishing machine supported upon a shaft or journal B and driven in the usual manner. The bearings of this shaft, preferably three in number, are shown at C, D and E, and are all vertically adjustable, being supported upon adjusting screws $c$, $d$ and $e$. The bearings D and E are provided with ways upon the uprights F and G, and the latter also support the adjusting screws of said bearings. The bearing C is the removable bearing and I mount it on a door H and removably secure the door to the upright J at the same side of the machine. The upright frame J has an opening $j$ sufficient to expose the end of the cylinder, and the door H is of such dimensions as will close this opening when it is in position. Said door moves vertically with the bearing C to the extent required in adjusting the cylinder, but I do not illustrate the method of securing it to the frame as it may be done in many ways, one way being illustrated in my application, Serial No. 385,735, filed March 20, 1891.

All the adjusting screws are operated simultaneously and to the same extent by a worm shaft K L meshing with the pinions $k$ upon the screws. The shaft extends to the side of the machine and is there provided with an operating wheel $i$. It is made in two parts, the part K being capable of a longitudinal movement without destroying its connection to the part L. To permit this a sleeve M is rigidly secured to the part L and extends over the end of the part K a sufficient distance to allow the part K to be slid outwardly the distance required in removing the bearing C from the cylinder shaft.

The part K is keyed to the sleeve M so that neither it nor the part L can rotate independently of the other. The adjusting screw $c$ and the movable part K of the worm shaft move unitedly with the bearing C and door H when the bearing is removed to the position indicated by broken lines at Fig. 1, and from that position may be turned on the worm shaft to one side, and thus give full and complete access to the cylinder end. In this tipping movement the screw $c$, requiring less power to operate it than does the worm shaft, will turn slightly and turn back again to its former position when the parts are tipped back to their vertical position. In case the worm shaft should turn in the tipping movement, it will naturally reverse its rotation when the tipping is reversed. In either case the alignment of the bearings is preserved, and in most cases the adjustment of the cylinder will remain unaffected.

The bearing $o$ of the adjusting screw $c$ is sustained from the worm shaft K by the arm $p$ encircling the latter.

It will be noticed that not only does the adjusting screw $c$ move with bearing C but also that the worm and gear by which it is operated remain in operative relation when the bearing C is removed.

I claim—

1. The combination with the bearings one of which is removable of a sand paper cylinder and adjusting supports for said bearings, of an extensible shaft for actuating the support in effecting the adjustments of said bearings, substantially as set forth.

2. The combination with the bearings of a sand paper cylinder, and adjusting supports for said bearings, one of said bearings being removable with its support, of an extensible shaft, substantially as specified.

3. The combination with a sand paper cylinder of a removable bearing, an adjusting support for said bearing removable therewith and a shaft for adjusting all the bearings of the cylinder, said shaft having a portion adapted to be slid longitudinally so as to avoid separating the gearing by which it actuates the support of said removable bearing, substantially as set forth.

4. The combination with a sand papering cylinder of suitable bearings, one of which is removable, supports for each of said bearings by means whereof they are adjusted vertically, and a worm shaft for causing such adjustment, the latter being made in two parts, one of which is movable longitudinally with respect to the other, substantially as set forth.

5. The combination with the sand papering cylinder of bearings therefor, and supporting and adjusting screws for such bearings, one of said bearings being removable together with its adjusting screw, and worms for rotating said screws, one of said worms being movable with said removable screw, substantially as set forth.

6. The combination with the sand papering cylinder of a removable and a non-removable bearing, adjusting screws supporting said bearings, worms operating the screws, and a shaft carrying the worms, the adjusting screw and worm of the removable bearing being movable with such bearing, substantially as set forth.

7. The combination with the removable bearing C, of an adjusting screw, a pinion on said screw, and a worm meshing with said pinion, all movable with said bearing, substantially as set forth.

8. The combination with a removable bearing of a supporting device by which the bearing may be vertically adjusted and actuating devices whereby said supporting device is moved in the adjusting operation, both the supporting device and the actuating devices being movable with the removable bearing, substantially as set forth.

9. The combination with the cylinder of a bearing, and its adjusting screw and a worm for rotating said screw, said bearing being removable and the screw and worm moving with it when removed, and a non-removable bearing with its adjusting screw and worm, the two worms being mechanically connected so that neither can turn independently of the other, substantially as set forth.

10. The combination with the adjusting screws, one of which is removable, of the worm shaft for rotating said screws, said shaft being made in two parts and coupled together by a sleeve, substantially as specified.

11. The combination with the sand papering cylinder of vertically adjustable bearings, one of which is removable, supports for said bearings, each carrying a worm pinion, and a shaft having worms meshing with said pinions, one part of said shaft being movable longitudinally and having a mechanical connection to the other part whereby the two parts are compelled to rotate together, substantially as set forth.

JAMES L. PERRY.

Witnesses:
H. M. MUNDAY,
LEW. E. CURTIS.